(12) United States Patent
Kim et al.

(10) Patent No.: US 10,050,305 B2
(45) Date of Patent: Aug. 14, 2018

(54) ELECTROLYTE FOR LITHIUM SECONDARY BATTERY AND LITHIUM SECONDARY BATTERY EMPLOYING THE SAME

(71) Applicant: Samsung SDI Co., Ltd., Yongin-si, Gyeonggi-do (KR)

(72) Inventors: Moon-Sung Kim, Yongin-si (KR); Duck-Hyun Kim, Yongin-si (KR); E-Rang Cho, Yongin-si (KR); Jeong-Hye Lee, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 603 days.

(21) Appl. No.: 14/543,630

(22) Filed: Nov. 17, 2014

(65) Prior Publication Data

US 2015/0171472 A1    Jun. 18, 2015

(30) Foreign Application Priority Data

Dec. 16, 2013 (KR) .................. 10-2013-0156615

(51) Int. Cl.
| | |
|---|---|
| *H01M 10/0567* | (2010.01) |
| *H01M 10/052* | (2010.01) |
| *H01M 10/0569* | (2010.01) |
| *H01M 10/0568* | (2010.01) |

(52) U.S. Cl.
CPC ..... *H01M 10/0567* (2013.01); *H01M 10/052* (2013.01); *H01M 10/0568* (2013.01); *H01M 10/0569* (2013.01); *H01M 2300/0028* (2013.01)

(58) Field of Classification Search
CPC ......... H01M 10/0567; H01M 10/0569; H01M 10/0568; H01M 10/052; H01M 2300/0028
See application file for complete search history.

(56) References Cited

U.S. PATENT DOCUMENTS

| 2003/0003370 A1* | 1/2003 | Arai ............... H01M 10/0567 429/326 |
| 2003/0113635 A1 | 6/2003 | Gan et al. |
| 2005/0123835 A1* | 6/2005 | Sun ............... H01M 10/0568 429/326 |
| 2006/0046151 A1 | 3/2006 | Otsuki et al. |
| 2009/0253046 A1* | 10/2009 | Smart ............... H01M 6/164 429/326 |
| 2010/0003597 A1 | 1/2010 | Tsunashima et al. |
| 2011/0230477 A1 | 9/2011 | Hoveyda et al. |
| 2013/0034759 A1 | 2/2013 | Funada et al. |

FOREIGN PATENT DOCUMENTS

| JP | 2002-198092 A | | 7/2002 |
| JP | 2013-055031 A | | 3/2013 |
| KR | 10-2005-0091753 A | | 9/2005 |
| KR | 10-2006-0063035 A | | 6/2006 |
| KR | 10-2009-0082694 A | | 7/2009 |
| KR | 20090082694 | * | 7/2009 |
| KR | 10-2011-0097930 A | | 8/2011 |

OTHER PUBLICATIONS

Ryou et al. "2-(triphenylphosphoranylidene)succinic anhydride as a new electrolyte additive to improve high temperature cycle performance of LiMn2O4/graphite Li-ion batteries"; Electrochimica Acta (2013)(online Apr. 9, 2013), 102, pp. 97-103.*

Korean Office Action dated Jul. 13, 2016 for Korean Patent Application No. KR 10-2013-0156615 which cites the above-identified reference numbered 1, and from which subject U.S. Appl. No. 14/543,630 claims priority.

* cited by examiner

*Primary Examiner* — Laura Weiner

(74) *Attorney, Agent, or Firm* — Knobbe Martens Olson & Bear LLP

(57) ABSTRACT

In an aspect, an electrolyte for a lithium secondary battery that includes a compound represented by Formula 1, a nonaqueous organic solvent, and a lithium salt, and a lithium secondary battery including the electrolyte are provided.

15 Claims, 7 Drawing Sheets

ELECTROLYTE FOR LITHIUM SECONDARY BATTERY AND LITHIUM SECONDARY BATTERY EMPLOYING THE SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0156615, filed on Dec. 16, 2013, in the Korean Intellectual Property Office, the disclosure of which is incorporated herein in its entirety by reference.

BACKGROUND

Field

This disclosure relates to an electrolyte for a lithium secondary battery, and a lithium secondary battery including the electrolyte.

Description of the Related Technology

Recently, lithium secondary batteries have drawn significant attention as power sources for small portable electronic devices. Lithium secondary batteries that use an organic electrolytic solution have a discharge voltage that is about twice as high as those that use an aqueous alkali electrolyte and a higher energy density than those that use aqueous alkali electrolytic solution.

As positive electrode active materials for lithium secondary batteries, lithium-transition metal oxides, such as $LiCoO_2$, $LiMn_2O_4$, and $LiNi_{1-x}Co_xO_2$ (where $0<X<1$), which have a structure that allows intercalation of lithium ions, are mainly used. Carbonaceous materials in various forms, such as artificial graphite, natural graphite and hard carbon, which allow intercalation and deintercalation of lithium ions, have been used as negative electrode active materials.

With an increasing use of lithium secondary batteries in high-temperature environments, there has been an increasing need to improve the safety of the lithium batteries. It is possible in certain contexts to improve the safety of lithium batteries by using flame-resistant electrolyte. However, the use of the flame-resistant electrolyte may lower the output power and lifetime of the lithium battery while at the same time increase the operating time of the lithium battery. Therefore, there is a need for improvement in this regard.

SUMMARY

One or more embodiments include a novel electrolyte for a lithium secondary battery, and a lithium secondary battery that includes the electrolyte. In some embodiments the lithium secondary battery including the novel electrolyte may have improved safety and improved power output and lifetime characteristics compared to a battery that does not include the novel electrolyte or that includes a different electrolyte.

Additional aspects will be set forth in part in the description which follows and, in part, will be apparent from the description, or may be learned by practice of the presented embodiments.

According to one or more embodiments, an electrolyte for a lithium secondary battery includes: a compound represented by Formula 1:

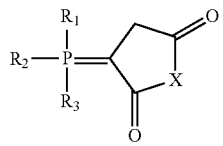

Formula 1 wherein, in Formula 1, $R_1$, $R_2$ and $R_3$ are each independently an unsubstituted C1-C30 alkyl group, an unsubstituted C1-C30 alkoxy group, an unsubstituted C2-C30 alkenyl group, an unsubstituted C2-C30 alkynyl group, an unsubstituted C6-C30 aryl group, an unsubstituted C6-C30 aryloxy group, an unsubstituted C7-C30 arylalkyl group, an unsubstituted C1-C30 heteroaryl group, an unsubstituted C1-C30 heteroaryloxy group, an unsubstituted C2-C30 heteroarylalkyl group, an unsubstituted C4-C30 carbon ring group, an unsubstituted C4-C30 carbocyclic alkyl group, an unsubstituted C2-C30 heterocyclic group, or an unsubstituted C2-C30 heterocyclic alkyl group, a cyano group, a halogen atom, a hydroxy group, a hydrazine, a hydrazone, a carboxyl group or a salt thereof, a sulfonyl group, a sulfamoyl group, a sulfuric acid group or salt thereof, or a phosphoric acid group or salt thereof, and X is an oxygen (O) or a sulfur (S);

a nonaqueous organic solvent; and a lithium salt.

According to one or more embodiments, a lithium secondary battery includes: a positive electrode; a negative electrode; a separator; and at least one selected from the above-described electrolyte and a reaction product of the electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
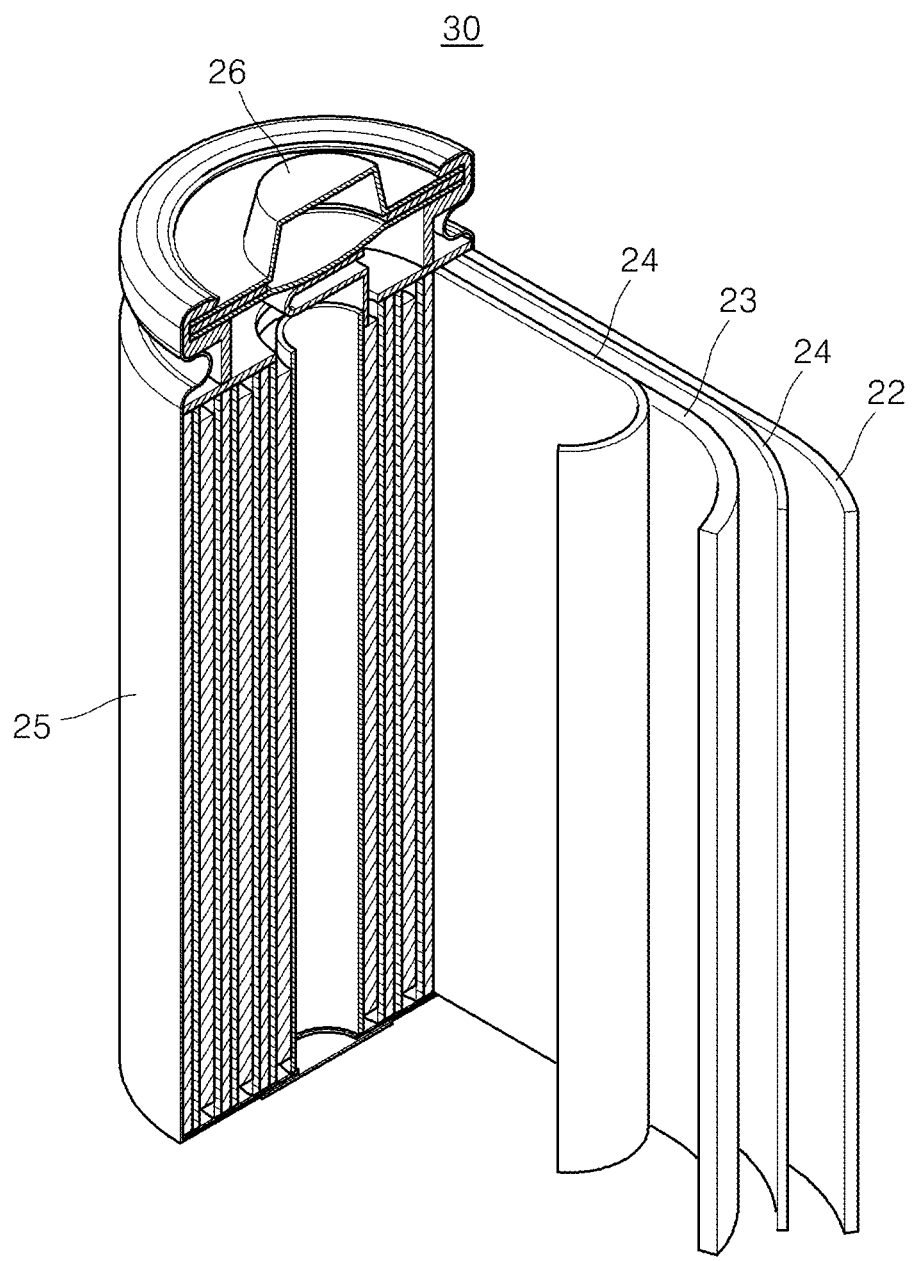
FIG. 1 is a schematic perspective view of a lithium secondary battery according to an embodiment.

Reference will now be made in detail to embodiments an electrolyte for lithium secondary batteries, and a lithium secondary battery including the electrolyte, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Additional aspects will be set forth in part in the description which follows and, in part, will be apparent from the description, or may be learned by practice of the presented embodiments.

According to an embodiment of the present disclosure, an electrolyte for a lithium secondary battery includes a nonaqueous organic solvent, a lithium salt, and a compound represented by Formula 1 below.

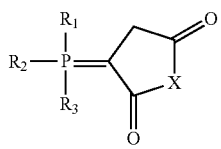

Formula 1

In Formula 1, $R_1$, $R_2$ and $R_3$ may be each independently an unsubstituted C1-C30 alkyl group, an unsubstituted C1-C30 alkoxy group, an unsubstituted C2-C30 alkenyl group, an unsubstituted C2-C30 alkynyl group, an unsubstituted C6-C30 aryl group, an unsubstituted C6-C30 aryloxy group, an unsubstituted C7-C30 arylalkyl group, an unsubstituted C1-C30 heteroaryl group, an unsubstituted C1-C30 heteroaryloxy group, an unsubstituted C2-C30 heteroarylalkyl group, an unsubstituted C4-C30 carbon ring group, an unsubstituted C4-C30 carbocyclic alkyl group, an unsubstituted C2-C30 heterocyclic group, or an unsubstituted C2-C30 heterocyclic alkyl group, a cyano group, a halogen atom, a hydroxy group, a hydrazine, a hydrazone, a carboxyl group or a salt thereof, a sulfonyl group, a sulfamoyl group, a sulfuric acid group or salt thereof, or a phosphoric acid group or salt thereof; and X may be an oxygen (O) or a sulfur (S).

When the compound of Formula 1 as an acid anhydride derivative including phosphorous (P) is used as an additive for an electrolyte, it may induce decomposition reaction on surfaces of a positive electrode and a negative electrode of a lithium secondary battery to form a solid electrolyte interface (SEI) on an interface between the positive electrode and the negative electrode, and thus may improve the safety of the lithium secondary battery.

In some embodiments, an amount of the compound of Formula 1 may be in a range of about 0.01 wt % to about 5 wt %, and in some embodiments, about 0.1 wt % to about 1 wt %. When the amount of the compound of Formula 1 is within these ranges, the compound of Formula 1 may improve the safety of the lithium secondary battery without deterioration in lifetime and output characteristics of the lithium secondary battery.

In some embodiments of Formula 1, $R_1$ to $R_3$ may be a C6-C30 aryl group or a C1-C30 alkyl group.

The C6-C30 aryl group may be, for example, a phenyl group. The C1-C30 alkyl group may be, for example, a methyl group, an ethyl group, a propyl group, a pentyl group, or a hexyl group.

In some embodiments, the compound of Formula 1 may be a compound represented by Formula 2 below or a compound represented by Formula 3 below:

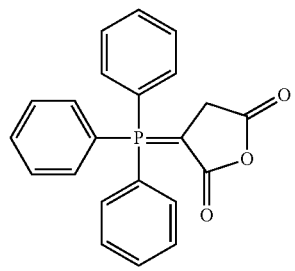

Formula 2

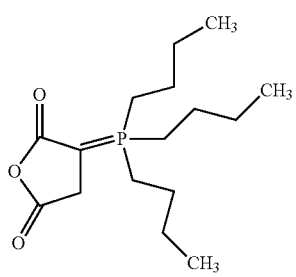

Formula 3

The nonaqueous organic solvent functions as a migration medium of ions involved in electrochemical reactions in batteries.

In some embodiments, the nonaqueous organic solvent may be at least one selected from a carbonate-based solvent, an ester-based solvent, an ether-based solvent, a ketone-based solvent, an alcohol-based solvent, and an aprotic solvent.

Examples of the carbonate-based solvent are dimethyl carbonate (DMC), diethyl carbonate (DEC), dipropyl carbonate (DPC), methylpropyl carbonate (MPC), ethylpropyl carbonate (EPC), methyl ethyl carbonate (MEC), ethylene carbonate (EC), propylene carbonate (PC), and butylene carbonate (BC). Examples of the ester-based solvent are methyl acetate, ethyl acetate, n-propyl acetate, dimethyl acetate, methyl propionate, ethyl propionate, γ-butyrolactone, decanolide, valerolactone, mevalonolactone, and caprolactone.

Examples of the ether-based solvent available as the nonaqueous organic solvent are dibutyl ether, tetraglyme, diglyme, dimethoxyethane, 2-methyltetrahydrofuran, and tetrahydrofuran. An example of the ketone-based solvent available as the nonaqueous organic solvent may be cyclohexanone. Non-limiting examples of the alcohol-based solvent are ethyl alcohol and isopropyl alcohol. Non-limiting examples of the aprotic solvent are nitriles, such as R—CN (wherein R is a straight, branched or cyclic C2-C30 hydrocarbon group, which may have a double-bonded aromatic ring or an ether bond); amides, such as dimethylformamide; dioxolanes, such as 1,3-dioxolane; and sulfolanes.

These nonaqueous organic solvents may be used alone or in combination of at least two thereof. A mixing ratio of the at least two of the nonaqueous organic solvents may appropriately varied depending on the desired performance of a battery, which will be obvious to one of ordinary skill in the art.

In some embodiments, the carbonate-based solvent may be a mixture of cyclic carbonate and chain carbonate. For example, a mixture of cyclic carbonate and chain carbonate in a volume ratio of about 1:1 to about 1:9 may be used to attain a high-performance electrolyte.

In some embodiments, the nonaqueous organic solvent may further include an aromatic hydrocarbon-based organic solvent in a carbonate-based solvent. In this regard, the carbonate-based solvent and the aromatic hydrocarbon-based organic solvent may be mixed, for example, in a volume ratio of about 1:1 to about 30:1.

An example of the aromatic hydrocarbon-based organic solvent is an aromatic hydrocarbon-based compound represented by Formula 4 below:

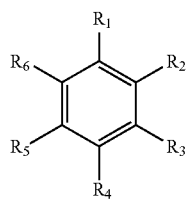

Formula 4 wherein in Formula 4, $R_1$ to $R_6$ may be each independently a hydrogen, a halogen atom, a C1-C10 alkyl group, a C1-C10 haloalkyl group, or a combination thereof.

Examples of the aromatic hydrocarbon-based organic solvent are benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

In some embodiments, the nonaqueous organic solvent may further include vinylene carbonate or an ethylene carbonate-based compound represented by Formula 5 to improve the lifetime characteristics of a lithium secondary battery.

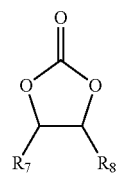

Formula 5 wherein in Formula 5, $R_7$ and $R_8$ may be each independently a hydrogen, a halogen group, a cyano (CN) group, a nitro ($NO_2$) group, or a C1-C5 fluoroalkyl group, wherein at least one of $R_7$ and $R_8$ may be a halogen group, a cyano (CN) group, a nitro ($NO_2$) group, or a C1-C5 fluoroalkyl group.

Non-limiting examples of the ethylene carbonate-based compound are difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. When the vinylene carbonate or ethylene carbonate-based compound is further used, an amount of the vinylene carbonate or ethylene carbonate-based compound may be appropriately adjusted to improve the lifetime characteristics of a lithium secondary battery.

The lithium salt is dissolved in the nonaqueous organic solvent to serve as a source of lithium ions in a lithium secondary battery, thereby enabling the basic operation of the lithium secondary battery. The lithium salt also facilitates the migration of lithium ions between the positive electrode and the negative electrode. Non-limiting examples of the lithium salt are $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, and $LiB(C_2O_4)_2$ (lithium bis(oxalato)borate), or a combination thereof, which may be used as supporting electrolyte salts. In some embodiments, a concentration of the lithium salt may be in a range of about 0.1 to about 2.0M.

When the concentration of the lithium salt is within this range, the electrolyte may have an appropriate conductivity and viscosity, and thus may improve performance of the electrolyte, and ensure effective migration of lithium ions.

In some embodiments, the nonaqueous organic solvent may be a mixture of ethylene carbonate (EC) and ethylmethyl carbonate (EMC) or a mixture of EC, EMC, and diethylene carbonate (DEC).

For example, the nonaqueous organic solvent may be at least one selected from dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), fluoroethylene carbonate (FEC), vinylene carbonate (VC), acetonitrile, succinonitrile (SN), N,N-dimethyl sulfoxide, N,N-dimethyl formamide, N,N-dimethyl acetamide, γ-butyrolactone, and tetrahydrofuran.

According to another embodiment of the present disclosure, a lithium secondary battery includes a positive electrode, a negative electrode, a separator, and at least one of any of the electrolytes according to the above-described embodiments and a reaction product of the electrolyte.

In an embodiment, the lithium secondary battery may include a reaction product of any of the electrolytes according to the above-described embodiments.

In some embodiments, the negative electrode may include a negative electrode active material, for example, a material that allows reversible intercalation and deintercalation of lithium ions, lithium metal, a lithium metal alloy, a material that allows doping or undoping of lithium, or a transition metal oxide.

In some embodiments, the positive electrode may include a positive electrode active material that allows reversible intercalation and deintercalation of lithium ions.

In some embodiments, the electrolyte of the lithium secondary battery may include a nonaqueous organic solvent as described above, a lithium salt, and a compound represented by Formula 1, wherein an amount of the compound of Formula 1 may be in a range of about 0.1 wt % to about 3 wt %:

Hereinafter, a method of manufacturing a lithium secondary battery using any of the electrolytes according to the above-described embodiments, will be described, according to an embodiment of the present invention in which the lithium battery may include a positive electrode, a negative electrode, the electrolyte, and a separator.

In some embodiments, the positive electrode and the negative electrode may be fabricated by respectively coating a positive active material layer composition and a negative active material layer composition on current collectors and drying the resulting products.

In some embodiments, the positive active material layer composition may be prepared by mixing a positive active material, a conducting agent, a binder, and a solvent, wherein the positive active material may be the lithium composite oxide of Formula 2 above.

A compound (lithiated intercalation compound) which allows reversible intercalation and deintercalation of lithium may be used as the positive electrode active material.

In some embodiments, the positive active material may be at least one selected from lithium cobalt oxide ($LiCoO_2$); lithium nickel oxide ($LiNiO_2$); lithium manganese oxides, such as $Li_{1+x}Mn_{2-x}O_4$ (where x is in a range of 0 to 0.33), $LiMnO_3$, $LiMn_2O_3$, or $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxide ($V_2O_5$); nickel-site type lithium nickel oxide ($LiNi_{1-x}M_xO_2$) (where M is Co, Mn, Al, Cu, Fe, Mg, B, or Ga, and x is in a range of 0.01 to 0.3); lithium manganese oxides, such as $LiMn_{2-x}M_xO_2$ (where M is Co, Ni, Fe, Cr, Zn, or Ta, and x is in a range of 0.01 to 0.1) or $Li_2Mn_3MO_8$ (where M is Fe, Co, Ni, Cu, or Zn); a lithium manganese oxide ($LiMn_2O_4$) with lithium partially substituted with alkali earth metal ions; a disulfide compound; and iron molybdenum oxide ($Fe_2(MoO_4)_3$).

For example, the positive active material may be a mixture of lithium cobalt oxide and lithium nickel cobalt manganese oxide.

The binder for the positive electrode may be any material that may bind positive active materials together or to positive electrode current collector. For example, the binder for the positive electrode may be at least one selected from polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon, but is not limited thereto.

In some embodiments, the positive electrode active material may be at least one selected from the group consisting of lithium cobalt oxide, lithium nickel cobalt manganese oxide, lithium nickel cobalt aluminum oxide, lithium iron phosphorous oxide, and lithium manganese oxide, but is not limited thereto. Any positive electrode active materials available in the art may be used.

For example, the positive active material may be a compound represented by one of the following formulae: $Li_aA_{1-b}B^1{}_bD^1{}_2$ (where $0.90 \le a \le 1.8$ and $0 \le b \le 0.5$); $Li_aE_{1-b}B^1{}_bO_{2-c}D^1{}_c$ (where $0.90 \le a \le 1.8$, $0 \le b \le 0.5$, and $0 \le c \le 0.05$); $LiE_{2-b}B^1{}_bO_{4-c}D^1{}_c$ (where $0 \le b \le 0.5$ and $0 \le c \le 0.05$); $Li_aNi_{1-b-c}Co_bB^1{}_cD^1{}_\alpha$ (where $0.90 \le a \le 1.8$, $0 \le b \le 0.5$, $0 \le c \le 0.05$, and $0 < \alpha \le 2$); $Li_aNi_{1-b-c}Co_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Co_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Mn_bB^1{}_cD^1{}_\alpha$ (where $0.90 \le a \le 1.8$, $0 \le b \le 0.5$, $0 \le c \le 0.05$, and $0 < \alpha \le 2$); $Li_aNi_{1-b-c}Mn_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Mn_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$ and $0.001 \le b \le 0.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A is selected from the group consisting of nickel (Ni), cobalt (Co), manganese (Mn), and combinations thereof; $B^1$ is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ is selected from the group consisting of oxygen (O), fluorine (F), sulfur (S), phosphorus (P), and combinations thereof; E is selected from the group consisting of cobalt (Co), manganese (Mn), and combinations thereof; $F^1$ is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; $I^1$ is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above as positive active materials may have a surface coating layer (hereinafter, "coating layer"). Alternatively, a mixture of a compound without having a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the positive electrode active material when a compound of the coating element is used. For example, the coating layer may be formed using a spray coating method, a dipping method, or the like. This is obvious to those of skill in the art, and thus a detailed description thereof will be omitted.

The binder facilitates binding of components such as the positive active material and the conducting agent, and binding of the positive active material layer composition to the current collector. In some embodiments, the amount of the binder may be from about 1 part to about 50 parts by weight based on 100 parts by weight of the total weight of the positive active material. Non-limiting examples of the binder are polyvinylidene fluoride (PVDF), polyvinyl alcohols, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, and various copolymers. In some embodiments, the amount of the binder may be from about 2 parts to about 100 parts by weight based on 100 parts by weight of the positive active material. When the amount of the binder is within this range, the positive active material layer may bind strongly to the current collector.

The conducting agent is not particularly limited, and may be any material as long as it has an appropriate conductivity without causing chemical changes in the fabricated battery. Non-limiting examples of the conducting agent are graphite such as natural or artificial graphite; carbonaceous materials such as carbon black, acetylene black, ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and other conductive materials such as polyphenylene derivatives.

In some embodiments, the amount of the conducting agent may be from about 2 parts to about 5 parts by weight based on 100 parts by weight of the positive active material. When the amount of the conducting agent is within this range, the negative electrode may have better conductive characteristics.

A non-limiting example of the solvent is N-methylpyrrolidone (NMP).

In some embodiments, the amount of the solvent may be from about 100 part to about 2000 parts by weight based on 100 parts by weight of the positive active material. When the amount of the solvent is within this range, forming the positive active material layer may be facilitated.

In some embodiments, a positive electrode current collector is fabricated to have a thickness of from about 3 μm to about 500 μm, and may be any current collector as long as it has high conductivity without causing chemical changes in the fabricated battery. Examples of the positive electrode current collector include stainless steel, aluminum, nickel, titanium, thermal-treated carbon, and aluminum or stainless steel that is surface-treated with carbon, nickel, titanium, or silver. In some embodiments, the positive electrode current collector may be processed to have fine irregularities on a surface thereof so as to enhance an adhesive strength of the current collector to the positive active material. In some embodiments, the positive electrode current collector may be in any of various forms, including a film, a sheet, a foil, a net, a porous structure, foam, and non-woven fabric.

Apart from the positive active material layer composition prepared above, a composition for forming a negative active material layer is prepared using a negative active material, a binder, a conducting agent, and a solvent together.

In some embodiments, the negative active material may be a material that allows intercalation and deintercalation of lithium ions. Non-limiting examples of the negative active material are graphite, carbonaceous material, lithium metal, lithium alloys, and silicon oxide-based materials. In one embodiment, the negative active material may be silicon oxide.

Examples of the carbonaceous material are crystalline carbon, amorphous carbon, and mixtures thereof. Non-limiting examples of the crystalline carbon are graphite, such as natural graphite or artificial graphite that are in amorphous, plate, flake, spherical or fibrous form. Non-limiting examples of the amorphous carbon are soft carbon (carbon sintered at low temperatures), hard carbon, mesophase pitch carbides, sintered corks, graphene, carbon black, fullerene soot, carbon nanotubes, and carbon fibers. Any appropriate material available in the art may be used.

In some embodiments, the amount of the binder may be from about 1 part to about 50 parts by weight based on 100 parts by weight of the total weight of the negative active material. Non-limiting examples of the binder are those described in connection with the positive electrode.

In some embodiments, the amount of the conducting agent may be from about 1 part to about 5 parts by weight based on 100 parts by weight of the negative active material. When the amount of the conducting agent is within this range, the negative electrode may have better conductive characteristics.

In some embodiments, the amount of the solvent may be from about 100 parts to about 2000 parts by weight based on 100 parts by weight of the negative active material. When the amount of the solvent is within this range, forming the negative active material layer may be facilitated.

The same kinds of conducting agents and solvents as those used in the positive electrode may be used.

In some embodiments, a negative electrode current collector is fabricated to have a thickness of about 3 μm to about 500 μm. The negative electrode current collector is not particularly limited, and may be any material as long as it has an appropriate conductivity without causing chemical changes in the fabricated battery. Non-limiting examples of the negative electrode current collector are copper, stainless steel, aluminum, nickel, titanium, thermal-treated carbon, copper or stainless steel that is surface-treated with carbon, nickel, titanium or silver, and aluminum-cadmium alloys. In addition, similar to the positive electrode current collector, the negative electrode current collector may be processed to have fine irregularities on a surface thereof so as to enhance the adhesive strength of the negative electrode current collector to the negative active material, and may be used in any of various forms, including a film, a sheet, a foil, a net, a porous structure, foam, and non-woven fabric.

The separator is disposed between the positive and negative electrodes manufactured according to the processes described above. In some embodiments, the separator may have a pore diameter of about 0.01 μm to about 10 μm and a thickness of about 5 μm to about 20 μm. Examples of the separator are olefin-based polymers, such as polypropylene, having resistance to chemicals and hydrophobic properties, and sheets or non-woven fabric made of glass fiber or polyethylene. When a solid electrolyte, for example, a polymer electrolyte, is used, the solid electrolyte may also serve as the separator.

In some embodiments, the separator may be a monolayer or a multilayer including at least two layers of olefin-based polymer, for example, polyethylene, polypropylene, polyvinylidene fluoride, or a combination thereof. In some embodiments, the multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

FIG. 1 is a schematic perspective view of a lithium secondary battery 30 according to an embodiment.

Referring to FIG. 1, the lithium secondary battery 30 may include a positive electrode 23, a negative electrode 22, a separator 24 between the positive electrode 23 and the negative electrode 22, an electrolyte (not shown) according to any of the above-described embodiment that impregnates an electrode assembly including the positive electrode 23, the negative electrode 22, and the separator 24 between the positive electrode 23 and the negative electrode 22, a battery case 25, and a cap assembly member 26 that seals the battery case 25. In some embodiments, the lithium battery 30 may be manufactured by sequentially stacking the positive electrode 23, the negative electrode 22, and the separator 24 upon one another to form a stack, rolling the stack into a spiral form, and encasing the rolled up stack into the battery case 25. In some embodiments, the battery case 25 may be sealed along with the cap assembly 26, thereby completing the manufacture of the lithium battery 30.

Substituents in the formulae above may be defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C30 alkoxyalkyl group, a hydroxyl group, a nitro group, a cyano group an amino group, an amidano group, hydrazine, hydrazone, a carboxyl group or a salt thereof, a sulfonyl group, a sulfamoyl group, a sulfonic acid group or a salt thereof, a phosphoric acid or a salt thereof, a C1-C20 alkyl group, a C2-C30 alkenyl group, a C2-C30 alkynyl group, a C6-C30 aryl group, a C6-C30 arylalkyl group, a C6-C30 heteroaryl group, a C7-C30 heteroarylalkyl group, a C6-C30 heteroaryloxyl group, a C6-C30 heteroaryloxyalkyl group, or a C6-C30 heteroarylalkyl group.

The term "halogen atom" indicates fluorine, bromine, chloride, or iodine.

The term "C1-C20 alkyl group substituted with a halogen atom" indicates a C1-C20 alkyl group substituted with at least one halo group. Non-limiting examples of the C1-C20 alkyl group substituted with a halogen atom include polyhaloalkyls including monohaloalkyl, dihaloalkyl, or perhaloalkyl.

Monohaloalkyls indicate alkyl groups including one iodine, bromine, chloride or fluoride. Dihaloalkyls and polyhaloalkyls indicate alkyl groups including at least two identical or different halo atoms.

As used herein, the term "alkoxy" represents "alkyl-O—", wherein the alkyl is the same as described above. Non-limiting examples of the alkoxy group include methoxy, ethoxy, propoxy, 2-propoxy, butoxy, t-butoxy, pentyloxy, hexyloxy, cyclopropoxy, and cyclohexyloxy. At least one hydrogen atom of the alkoxy group may be substituted with the same substituents as those recited above in conjunction with the alkyl group.

As used herein, the term "alkoxyalkyl" indicates an alkoxy group as defined above connected, as a substituent, via an alkyl group. At least one hydrogen atom of the alkoxyalkyl group may be substituted with substituents that are the same as those recited above in conjunction with the alkyl group.

As used herein, the term "alkenyl" indicates a branched or unbranched hydrocarbon with at least one carbon-carbon double bond. Non-limiting examples of the alkenyl group are a vinyl group, an aryl group, a butenyl group, an isopropenyl group, and an isobutenyl group. At least one hydrogen atom in the alkenyl group may be substituted with substituents that are the same as those recited above in conjunction with the alkyl group.

As used herein, the term "alkynyl" indicated a branched or unbranched hydrocarbon with at least one carbon-carbon triple bond. Non-limiting examples of the "alkynyl" group include ethynyl, butynyl, isobutynyl, and isopropynyl. At least one hydrogen atom of the "alkynyl" group may be substituted with substituents that are the same as those recited above in conjunction with the alkyl group.

As used herein, the term "aryl" group, which is used alone or in combination, indicates an aromatic hydrocarbon containing at least one ring. The term "aryl" is construed as including a group with an aromatic ring fused to at least one cycloalkyl ring. Non-limiting examples of the "aryl" group are phenyl, naphthyl, and tetrahydronaphthyl. At least one hydrogen atom of the "aryl" group may be substituted with substituents that are the same as those recited above in conjunction with the alkyl group.

The term "arylalkyl" or "aryl-alkyl" indicates an aryl group connected, as a substituent, via an alkylene group, such as "$C_{7-14}$ arylalkyl" and the like, including but not limited to benzyl, 2-phenylethyl, 3-phenylpropyl, and naphthylethyl. In some embodiments, the "arylalkyl" group may be benzyl and phenyl-$CH_2CH_2$—.

As used herein, the term "aryloxy" indicates "—O-aryl". An example of the aryloxy group is phenoxy. At least one hydrogen atom of the "aryloxy" group may be substituted with substituents that are the same as those recited above in conjunction with the alkyl group.

As used herein, the term "heteroaryl group" indicates a monocyclic or bicyclic aromatic ring system radical including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. In fused bicyclic ring systems, the one or more heteroatoms may be present in only one of the rings. Examples of heteroaryl groups include, but are not limited to, furanyl, thienyl, imidazolyl, quinazolinyl, quinolinyl, isoquinolinyl, quinoxalinyl, pyridinyl, pyrrolyl, oxazolyl, indolyl, and the like.

At least one hydrogen atom of the heteroaryl group may be substituted with the same substituents as those recited above in conjunction with the alkyl group.

The term "heteroarylalkyl" or "heteroaryl-alkyl" group a heteroaryl group connected, as a substituent, via an alkylene group. At least one hydrogen atom of the heteroarylalkyl group may be substituted with the same substituents as those recited above in conjunction with the alkyl group The term "heteroaryloxy" group indicates a "—O-heteroaryl moiety". At least one hydrogen atom of the heteroaryloxy group may be substituted with the same substituents as those recited above in conjunction with the alkyl group.

The term "heteroaryloxyalkyl" group indicates a heteroaryloxy group connected, as a substituent, via an alkylene group. At least one hydrogen atom of the heteroaryloxyalkyl group may be substituted with the same substituents as those recited above in conjunction with the alkyl group.

As used herein, the term "carbocyclic" group indicates a saturated or partially unsaturated non-aromatic monocyclic, bicyclic or tricyclic hydrocarbon group. Non-limiting examples of the carbocyclic group are a cyclopentyl group, a cyclopentenyl group, a cyclohexyl group, and an adamantyl group. At least one hydrogen atom of the "carbocyclic group" may be substituted with substituents that are the same as those recited above in conjunction with the alkyl group.

As used herein, the term "heterocyclic group" indicates a five- to ten-membered non-aromatic ring including a heteroatom such as N (nitrogen), S (sulfur), P (phosphorus), or O (oxygen). An example of the heterocyclic group is piperidinyl. At least one hydrogen atom in the heterocyclic group may be substituted with substituents that are the same as those recited above in conjunction with the alkyl group.

The term "heterocyclic oxy" indicates "—O-heterocyclic group". At least one hydrogen atom of the heterocyclic oxy group may be substituted with the same substituents as those recited above in conjunction with the alkyl group.

The term "sulfonyl" indicates R"—$SO_2$—, where R" is a hydrogen atom, an alkyl group, an aryl group, a heteroaryl group, an aryl-alkyl group, a heteroaryl-alkyl group, an alkoxy group, an aryloxy group, a cycloalkyl group, or a heterocyclic group.

The term "sulfamoyl" group refers to $H_2NS(O_2)$—, alkyl-$NHS(O_2)$—, $(alkyl)_2NS(O_2)$-aryl-$NHS(O_2)$—, alkyl-(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—. At least one hydrogen atom of the sulfamoyl group may be substituted with the same substituents as those described above in conjunction with the alkyl group.

The term "amino group" indicates a group with a nitrogen atom covalently bonded to at least one carbon or hetero atom. The amino group may refer to, for example, —$NH_2$ and substituted moieties. The term "amino group" also refers to an "alkylamino group" with nitrogen bound to at least one additional alkyl group, and "arylamino" and "diarylamino" groups with at least one or two nitrogen atoms bound to a selected aryl group.

One or more embodiments will now be described in detail with reference to the following examples. However, these examples are only for illustrative purposes and are not intended to limit the scope of the one or more embodiments of the present disclosure.

Example 1: Preparation of Electrolyte

After $LiPF_6$ was added to a mixture of 10 vol % of ethylmethyl carbonate (EC), 10 vol % of ethylmethylcarbonate (EMC), and 80 vol % of dimethylcarbonate (DMC) as a nonaqueous organic solvent to a concentration of about 1.3M, about 1.0 wt % of a compound represented by Formula 2 below, about 5.0 wt % of fluoroethylene carbonate (FEC), about 0.5 wt % of vinylethylene carbonate (VEC), about 1 wt % of succinonitrile (SN), and about 0.2 wt % of $LiBF_4$, each based on 100 weight % of a total weight of electrolyte, were added thereto to prepare an electrolyte.

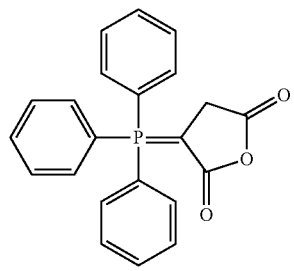

Formula 2

Example 2: Preparation of Electrolyte

An electrolyte was prepared in the same manner as in Example 1, except that a compound represented by Formula 3 below, instead of the compound of Formula 2, was used.

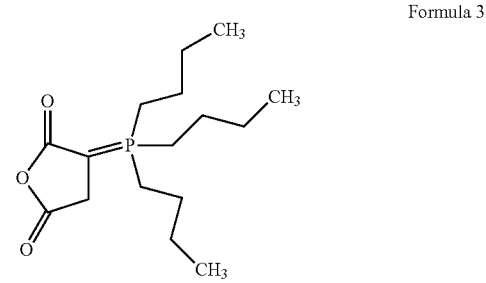 [SMILES: CCCCP(CCCC)(CCCC)=C1CC(=O)OC1=O]

Formula 3

Comparative Example 1: Preparation of Electrolyte

An electrolyte was prepared in the same manner as in Example 1, except that a compound represented by Formula 6 below, instead of the compound of Formula 2, was used.

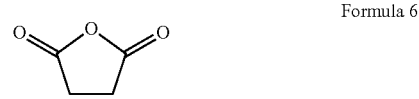

Formula 6

Comparative Example 2: Preparation of Electrolyte

An electrolyte was prepared in the same manner as in Example 1, except that a compound represented by Formula 7 below, instead of the compound of Formula 2, was used.

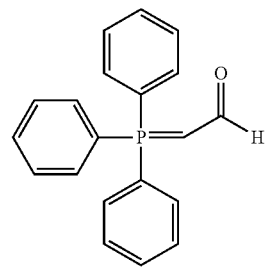

Formula 7

Comparative Example 3: Preparation of Electrolyte

An electrolyte was prepared in the same manner as in Example 1, except that a mixture of the compound of Formula 4 and the compound of Formula 5 in a weight ratio of about 1:1, instead of the compound of Formula 2, was used.

Reference Example 1: Preparation of Electrolyte

An electrolyte was prepared in the same manner as in Example 1, except that the compound of Formula 2 was not used.

Manufacture Example 1: Manufacture of Lithium Secondary Battery $LiNi_{0.5}Co_{0.2}Mn_{0.3}$ as a positive electrode active material, polyvinylidene fluoride (PVDF) as a binder, and carbon as a conducting agent were mixed in a weight ratio of about 92:4:4, and then dispersed in N-methyl-2-pyrrolidone to prepare a positive electrode active material layer composition. The positive electrode active material layer composition was coated on an aluminum foil having a thickness of 20 μm, dried and then pressed to manufacture a positive electrode.

Graphite as a negative electrode active material, styrene butadiene rubber (SBR) as a binder, and carboxymethyl cellulose (CMC) were mixed in a weight ratio of 92:4:4, and then dispersed in N-methyl-2-pyrrolidone to prepare a negative electrode active material layer composition. The negative electrode active material layer composition was coated on a copper foil having a thickness of 15 μm, dried and then pressed to manufacture a negative electrode.

With a polyethylene separator having a thickness of about 18 μm disposed between the positive electrode and the negative electrode, the electrolyte of Example 1 was injected into the resultant structure, thereby manufacturing a lithium secondary battery.

Manufacture Example 2: Manufacture of Lithium Secondary Battery

A lithium secondary battery was manufactured in the same manner as in Manufacture Example 1, except that the electrolyte of Example 2, instead of the electrolyte of Example 1, was used.

Comparative Manufacture Examples 1-3: Manufacture of Lithium Secondary Batteries Lithium secondary batteries were manufactured in the same manner as in Manufacture Example 1, except that the electrolytes of Comparative Examples 1, 2, and 3, instead of the electrolyte of Example 1, were used, respectively.

Reference Manufacture Example 1: Manufacture of Lithium Secondary Battery

A lithium secondary battery was manufactured in the same manner as in Manufacture Example 1, except that the electrolyte of Reference Example 1, instead of the electrolyte of Example 1, was used.

Evaluation Example 1: Charge-Discharge Test

A charge-discharge test was performed on the lithium secondary batteries of Manufacture Example 1 and Reference Manufacture Example 1 in the following conditions.

Each of the lithium secondary batteries of Manufacture Example 1 and Reference Manufacture Example 1 was charged at a constant current of 0.2 C at about 25° C. to a voltage of 4.2V (with respect to Li), followed by discharging at a constant current of 0.2 C to a voltage of about 2.7V (with respect to Li) (1st cycle of formation process.

Subsequently, each of the lithium secondary batteries was charged at a constant current of 0.5 C rate at about 25° C. to a voltage of about 4.5V (with respect to Li), followed by discharging at a constant current of 0.5 C to a voltage of about 2.7V (with respect to Li) (2nd cycle of formation process).

Subsequently, each of the lithium secondary batteries that underwent the formation process was charged at a constant current of 0.5 C rate at about 25° C. to a voltage of about 4.35V (with respect to Li), followed by discharging at a constant current of about 1.0 C rate to a voltage of about 3.1V (with respect to Li). This cycle of charging and discharging was repeated 100 times. (Charging: CV mode charge voltage 4.35V, 0.5 C, 0.1 C cut-off; and Discharging: CC mode, 3.1V, 1.0 C)

Figure 2:
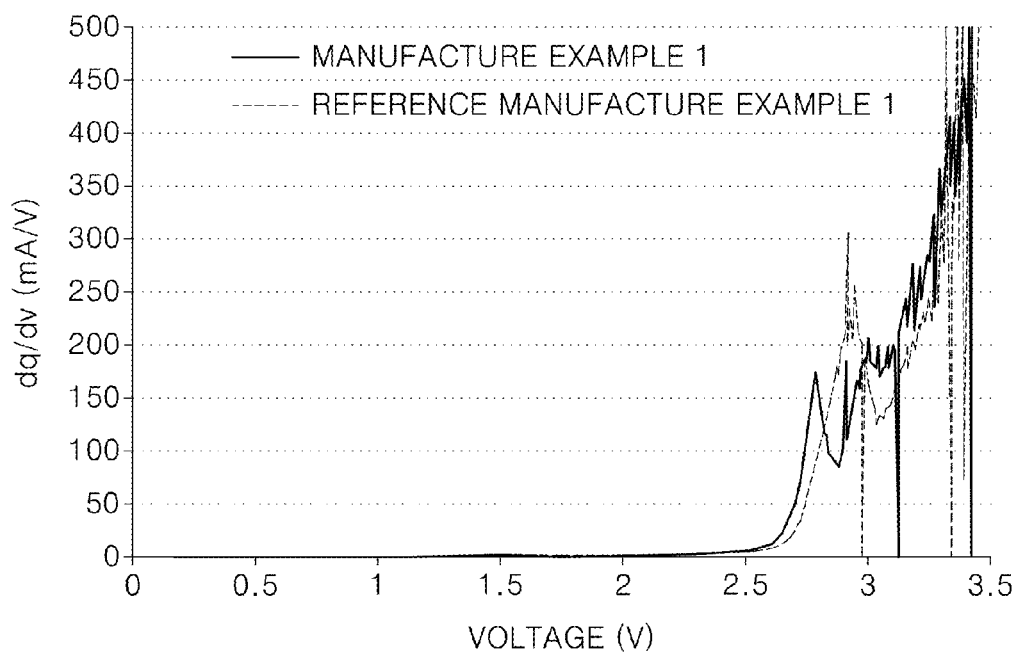
FIG. 2 is a graph of differential capacity (dQ/dv) curves of lithium secondary batteries of Manufacture Example 1 and Reference Manufacture Example 1 after the $1^{st}$ charge-discharge cycle.
Figure 3A:
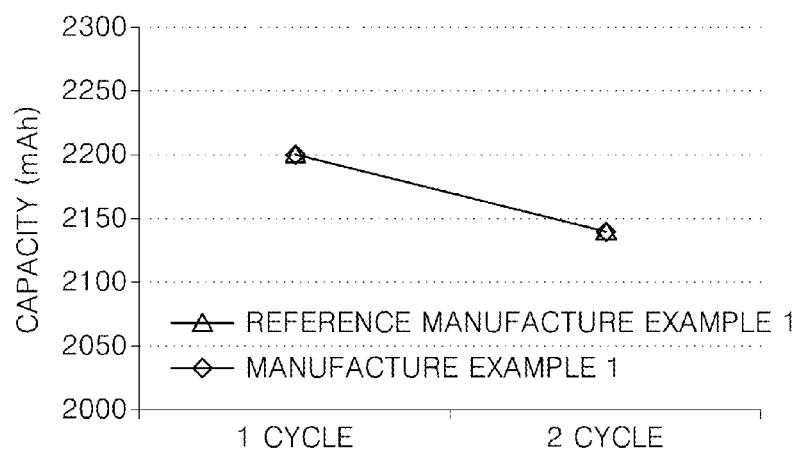
FIG. 3A is a graph of capacities of the lithium secondary batteries of Manufacture Example 1 and Reference Manufacture Example 1 after the $1^{st}$ and $2^{nd}$ charge-discharge cycles.
Figure 3B:
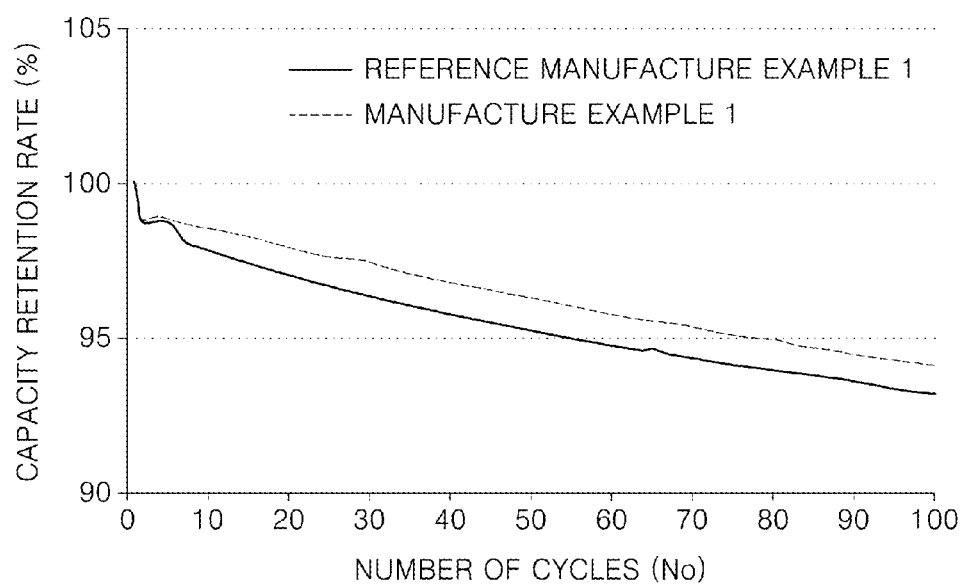
FIG. 3B is a graph of capacity retention rates of the lithium secondary batteries of Manufacture Example 1 and Reference Manufacture Example 1.

FIG. 2 is a graph of differential capacity (dQ/dv) curves of the lithium secondary batteries of Manufacture Example 1 and Reference Manufacture Example 1 after the $1^{st}$ charge-discharge cycle. FIG. 3A is a graph of capacities of the lithium secondary batteries of Manufacture Example 1 and Reference Manufacture Example 1 after the $1^{st}$ and $2^{nd}$ charge-discharge cycles. FIG. 3B is a graph of capacity retention rates of the lithium secondary batteries of Manufacture Example 1 and Reference Manufacture Example 1.

Referring to FIG. 2, an oxidation and reduction peak of the lithium secondary battery of Manufacture Example 1 using the electrolyte of Example 1 including the compound of Formula 2 appeared in a region of about 2.75 V to 2.8 V, while no oxidation and reduction peak of the lithium secondary battery of Reference Example 1 appeared, indicating that lithium secondary battery of Manufacture Example 1 includes a solid electrolyte interphase (SEI) resulting from the earlier decomposition of the compound of Formula 2 during the formation process than the solvent and additives of the electrolyte in the lithium secondary battery of Manufacture Example 1.

Referring to FIG. 3A, the lithium secondary battery of Manufacture Example 1 was found to have improved capacity characteristics. Referring to FIG. 3B, the lithium secondary battery of Manufacture Example 1 was found to have improved capacity retention rate even after the $100^{th}$ cycle, compared to the lithium secondary battery of Reference Manufacture Example 1.

TABLE 1

| Example | $1^{st}$ cycle | | $2^{nd}$ cycle | | Charge SOC = 100 |
| --- | --- | --- | --- | --- | --- |
| | Charging | Discharging | Charging | Discharging | |
| Reference Manufacture | 2540.0 | 2199.8 | 2211.2 | 2139.3 | 2219 |
| Manufacture Example 1 | 2549.0 | 2200.3 | 2211.7 | 2140.3 | 2214 |

Referring to Table 1, the lithium secondary battery of Manufacture Example 1 was found to have substantially the same initial capacity characteristics as those of the lithium secondary battery of Reference Manufacture Example 1, indicating that the use the electrolyte of Example 1 including the compound of Formula 2 did not deteriorate the lifetime and capacity characteristics of the lithium secondary battery of Manufacture Example 1.

Evaluation Example 2: Penetration Test of Lithium Secondary Battery

Three lithium secondary batteries were manufactured according to each of Manufacture Examples 1 and 2 and Comparative Manufacture Examples 1 to 3, and then subjected to a penetration test for evaluating safety against penetration. In the penetration test, the lithium secondary batteries were subjected to i) rated charging in a standard condition (1025 mA/4.35V, cut-off 102 mA), and then resting for about 10 minutes to about 72 hours. After the rated charging, ii) the lithium secondary batteries were completely penetrated through the middle of the battery with a nail having a diameter of about 2.5 mm at a rate of about 80 mm/s, and iii) any apparent defects and appearance of the test battery were observed. The results are shown in Table 2.

Figure 4:
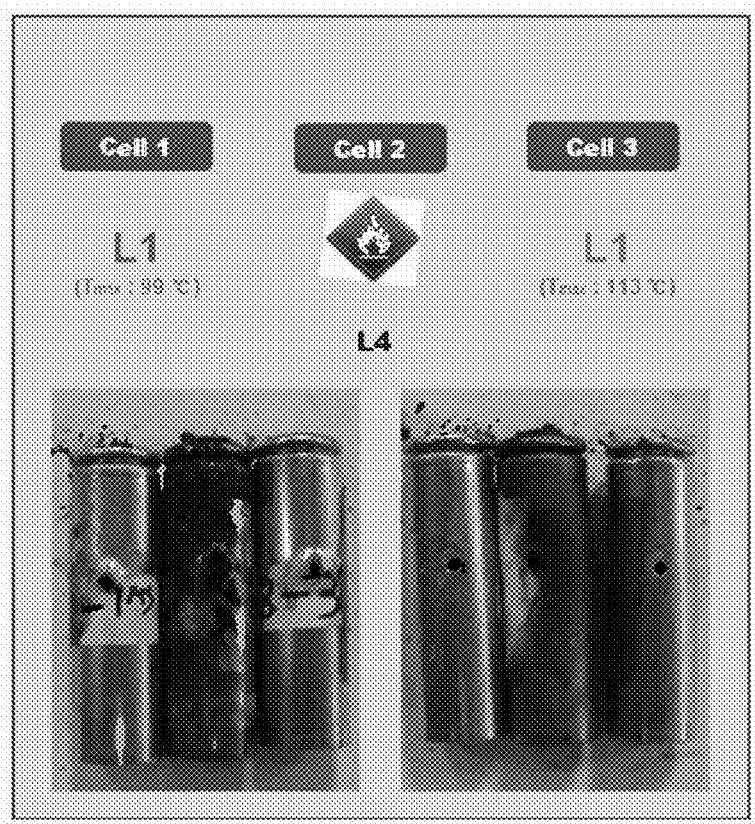
FIG. 4 is an image of penetration test results of the lithium secondary battery of Manufacture Example 1.
Figure 5:
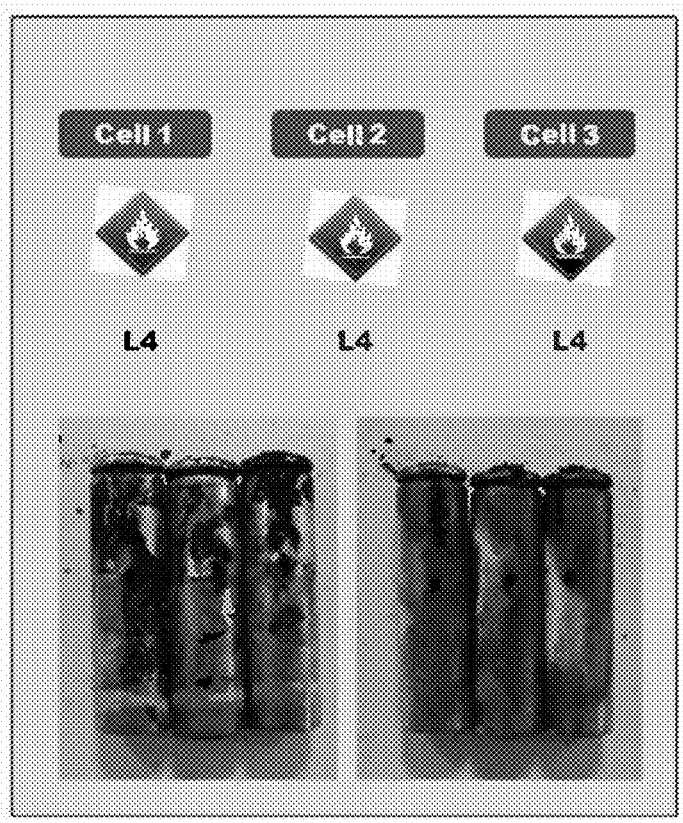
FIG. 5 is an image of penetration test results of the lithium secondary battery of Reference Manufacture Example 1.

FIG. 4 is an image of penetration test results of the lithium secondary battery of Manufacture Example 1. FIG. 5 is an image of penetration test results of the lithium secondary battery of Reference Manufacture Example 1. Evaluation criteria in the penetration test were as follows:
L0—good,
L1—leakage,
L2—generation of heat of less than 200° C.,
L3—generation of heat of about 200° C. or greater,
L4—fire,
L5—bursting.

Each battery test includes three cells. The results of the penetration test are provided in Table 2.

TABLE 2

| Example | Number of Cells Tested | Penetration test results |
|---|---|---|
| Manufacture Example 1 | 3 | (2)L1(1)L4 |
| Manufacture Example 2 | 3 | (2)L1(1)L4 |
| Comparative Manufacture Example 1 | 3 | (3)L4 |
| Comparative Manufacture Example 2 | 3 | (3)L4 |
| Comparative Manufacture Example 3 | 3 | (3)L4 |
| Reference Manufacture Example 1 | 3 | (3)L4 |

In Table 2, the number preceding "L1" or "L4" indicates the number of cells that meet the evaluation criteria.

Referring to Table 2, as the results of the penetration test, the lithium secondary batteries of Manufacture Examples 1 and 2 were found to have improved fire safety, compared to those of Comparative Manufacture Examples 1 to 3 and Reference Manufacture Example 1.

Evaluation Example 3: Accelerating Rate Calorimeter Test

Figure 8:
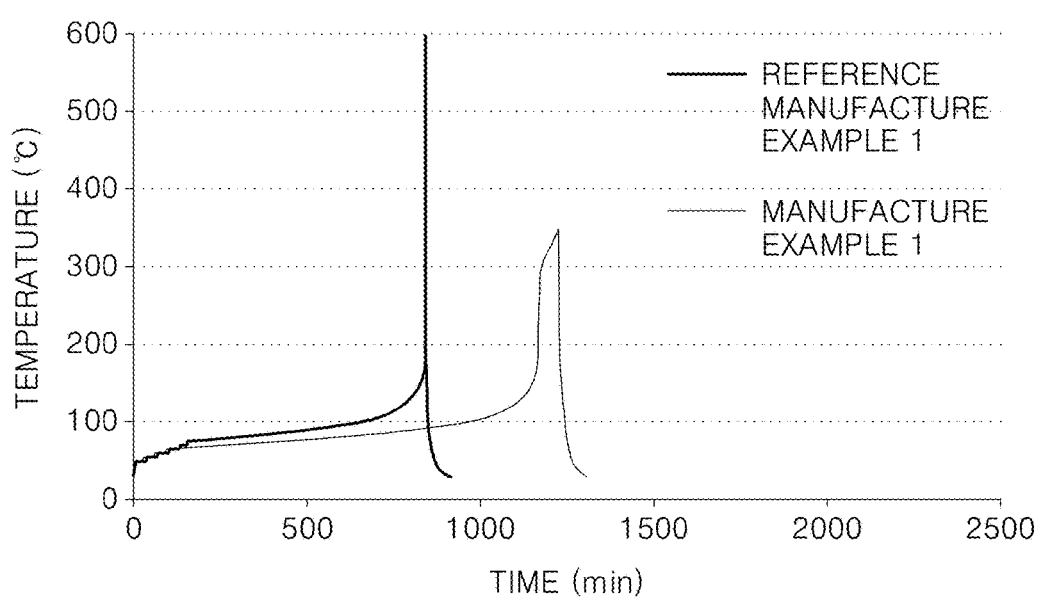
FIG. 8 is a graph of temperature changes with respect to time in the lithium secondary batteries of Manufacture Example 1 and Reference Manufacture Example 1.

One lithium secondary battery (18650 cylindrical type, 2200 mAh) was manufactured according to each of Manufacture Example 1 and Reference Manufacture Example 1 to 3, and then subjected to an accelerating rate calorimeter (ARC) test to evaluate thermal stability. In the ARC test, the lithium secondary batteries were subjected to i) rated charging in a standard condition (1025 mA/4.35V, cut-off 102 mA), and then resting for about 10 minutes to about 72 hours. After the rated charging, ii) while the temperature was increased to about 250° C. at a rate of about 5° C./min, a temperature change in each of the lithium secondary batteries was measured to evaluate thermal stability of the lithium secondary battery. The results are shown in FIG. 8.

Figure 6:
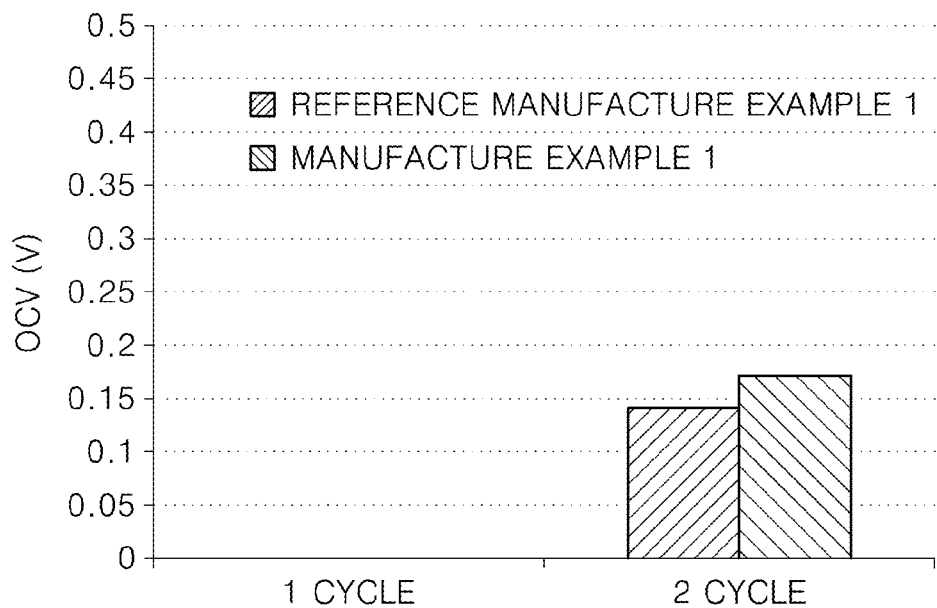
FIG. 6 is a graph of open-circuit voltage (OCV) changes in the lithium secondary batteries of Manufacture Example 1 and Reference Manufacture Example 1 that were measured after each lithium battery was stored for about 24 hours before a formation process.
Figure 7:
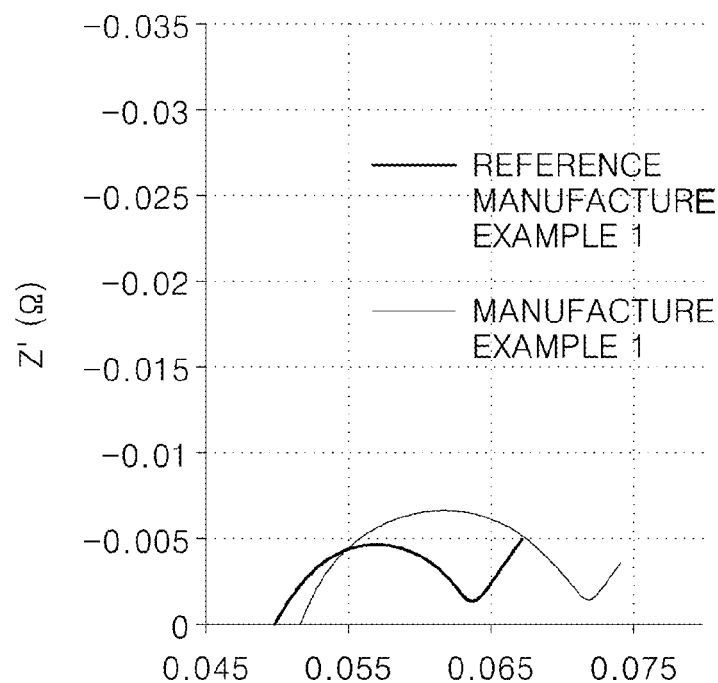
FIG. 7 is a graph of impedance characteristics of the lithium secondary batteries of Manufacture Example 1 and Reference Manufacture Example 1.

FIG. 6 is a graph of open-circuit voltage (OCV) changes in the lithium secondary batteries of Manufacture Example 1 and Reference Manufacture Example 1 that were measured after each lithium battery was stored for about 24 hours before the formation charge and discharge process. FIG. 7 is a graph of alternating current (AC) impedance of the lithium secondary batteries of Manufacture Example 1 and Reference Manufacture Example 1 measured in a frequency range of about $10^5$ to about $10^{-1}$. FIG. 8 is a graph of temperature changes with respect to time in the lithium secondary batteries of Manufacture Example 1 and Reference Manufacture Example 1.

Referring to FIG. 6, substantially no difference in OCV was found between the lithium secondary battery of Manufacture Example 1 and the lithium secondary battery of Reference Manufacture Example 1, indicating that the lithium secondary battery of Manufacture Example 1 is chemically stable.

Referring to FIG. 7, the lithium secondary battery of Manufacture Example 1 was found to have good impedance characteristics. Referring to FIG. 8, the lithium secondary battery of Manufacture Example 1 was found to have a lower self-heat generation rate with a temperature increase, compared to that of the lithium secondary battery of Reference Manufacture Example 1, and accordingly to have improved thermal characteristics.

As described above, according to the one or more embodiments of the present invention, a lithium secondary battery having improved safety and improved output and lifetime characteristics may be manufactured using any of the electrolytes according to the above-described embodiments.

It should be understood that the exemplary embodiments described therein should be considered in a descriptive sense only and not for purposes of limitation. Descriptions of features or aspects within each embodiment should typically be considered as available for other similar features or aspects in other embodiments.

In the present disclosure, the terms "Example," "Comparative Example," "Reference Example" "Manufacture Example," "Comparative Manufacture Example," "Reference Manufacture Example" and "Evaluation Example" are used arbitrarily to simply identify a particular example or experimentation and should not be interpreted as admission of prior art. While one or more embodiments of the present disclosure have been described with reference to the figures, it will be understood by those of ordinary skill in the art that various changes in form and details may be made therein without departing from the spirit and scope of the present embodiments as defined by the following claims.

What is claimed is:
1. An electrolyte for a lithium secondary battery, comprising:
a compound represented by Formula 1:

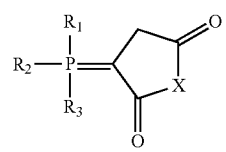

Formula 1 wherein, in Formula 1, $R_1$, $R_2$ and $R_3$ are each independently an unsubstituted C1-C30 alkyl group, an unsubstituted C1-C30 alkoxy group, an unsubstituted C2-C30 alkenyl group, an unsubstituted C2-C30 alkynyl group, a unsubstituted C6-C30 aryl group, an unsubstituted C6-C30 aryloxy group, an unsubstituted C7-C30 arylalkyl group, an unsubstituted C1-C30 heteroaryl group, an unsubstituted C1-C30 heteroaryloxy group, an unsubstituted C2-C30 heteroarylalkyl group, an unsubstituted C4-C30 carbon ring group, an unsubstituted C4-C30 carbocyclic alkyl group, an unsubstituted C2-C30 heterocyclic group, an unsubstituted C2-C30 heterocyclic alkyl group, a cyano group, a halogen atom, a hydroxy group, a hydrazine, or a hydrazone, and X is an oxygen (O) or a sulfur (S);

a nonaqueous organic solvent;

fluoroethylene carbonate (FEC), vinylene carbonate (VC), and succinonitrile (SN); and a lithium salt, wherein an amount of the compound represented by Formula 1 is in a range of about 0.5 wt % to about 5 wt % based on total amount of the electrolyte; and the nonaqueous organic solvent is a mixture of dimethyl carbonate (DMC), methylethyl carbonate (MEC), and ethylene carbonate (EC).

2. The electrolyte of claim 1, wherein $R_1$ to $R_3$ in Formula 1 are independently an unsubstituted C6-C30 aryl group or an unsubstituted C1-C30 alkyl group.

3. The electrolyte of claim 1, wherein the compound represented by Formula 1 is a compound represented by Formula 2 or a compound represented by Formula 3:

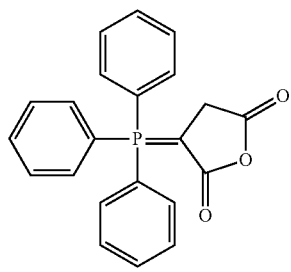

Formula 2

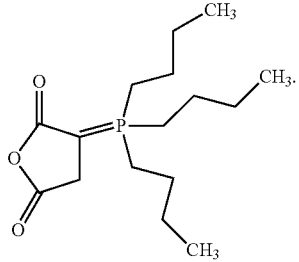

Formula 3

4. The electrolyte of claim 1, wherein the lithium salt is at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, and $LiB(C_2O_4)_2$ (lithium bis(oxalato)borate).

5. The electrolyte of claim 1, wherein a concentration of the lithium salt is in a range of about 0.1M to about 2.0M.

6. A lithium secondary battery comprising:

a positive electrode;

a negative electrode;

a separator; and an electrolyte comprising a compound represented by Formula 1, a nonaqueous organic solvent, fluoroethylene carbonate (FEC), vinylene carbonate (VC), succinonitrile (SN), and a lithium salt, and a reaction product of the electrolyte,

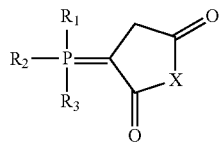

Formula 1 wherein, in Formula 1, $R_1$, $R_2$ and $R_3$ are each independently an unsubstituted C1-C30 alkyl group, an unsubstituted C1-C30 alkoxy group, an unsubstituted C2-C30 alkenyl group, an unsubstituted C2-C30 alkynyl group, an unsubstituted C6-C30 aryl group, an unsubstituted C6-C30 aryloxy group, an unsubstituted C7-C30 arylalkyl group, an unsubstituted C1-C30 heteroaryl group, an unsubstituted C1-C30 heteroaryloxy group, an unsubstituted C2-C30 heteroarylalkyl group, an unsubstituted C4-C30 carbon ring group, an unsubstituted C4-C30 carbocyclic alkyl group, an unsubstituted C2-C30 heterocyclic group, an unsubstituted C2-C30 heterocyclic alkyl group, a cyano group, a halogen atom, a hydroxy group, a hydrazine, or a hydrazone; and X is an oxygen (O) or a sulfur (S), wherein an amount of the compound represented by Formula 1 is in a range of about 0.5 wt % to about 5 wt % based on total amount of the electrolyte; and the lithium salt is a mixture of $LiPF_6$ and $LiBF_4$.

7. The lithium secondary battery of claim 6, wherein $R_1$ to $R_3$ in Formula 1 are each independently an unsubstituted C6-C30 aryl group or an unsubstituted C1-C30 alkyl group.

8. The lithium secondary battery of claim 6, wherein the compound represented by Formula 1 is a compound represented by Formula 2 or a compound represented by Formula 3:

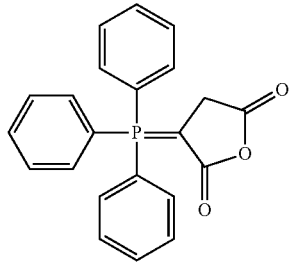

Formula 2

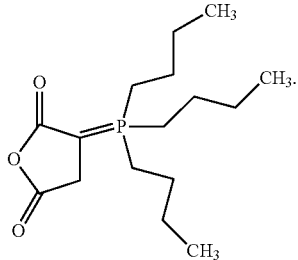

Formula 3

9. The lithium secondary battery of claim 6, wherein the nonaqueous organic solvent comprises at least one selected from a carbonate-based solvent, an ester-based solvent, an ether-based solvent, a ketone-based solvent, an alcohol-based solvent, and an aprotic solvent.

10. The lithium secondary battery of claim 6, wherein the nonaqueous organic solvent is a mixture of dimethyl carbonate (DMC), methylethyl carbonate (MEC), and ethylene carbonate (EC).

11. The lithium secondary battery of claim 6, wherein a concentration of the lithium salt is in a range of about 0.1M to about 2.0M.

12. An electrolyte for a lithium secondary battery, comprising: a compound represented by Formula 1:

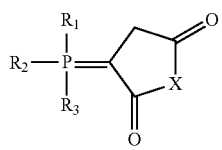

Formula 1 wherein, in Formula 1, $R_1$, $R_2$ and $R_3$ are each independently an unsubstituted C1-C30 alkyl group, and X is an oxygen (O) or a sulfur (S);
a nonaqueous organic solvent; and
a lithium salt,
wherein an amount of the compound represented by Formula 1 is in a range of about 0.5 wt % to about 5 wt % based on total amount of the electrolyte.

13. The electrolyte of claim 12, the compound represented by Formula 1 is a compound represented by Formula 3:

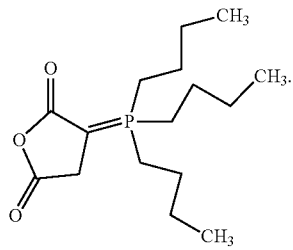

Formula 3

14. A lithium secondary battery comprising:
a positive electrode; a negative electrode; a separator; and
an electrolyte comprising a compound represented by Formula 1, a nonaqueous organic solvent, and a lithium salt, and a reaction product of the electrolyte:

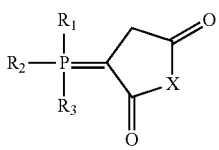

Formula 1 wherein, in Formula 1, $R_1$, $R_2$ and $R_3$ are each independently an unsubstituted C1-C30 alkyl group, and X is an oxygen (O) or a sulfur (S),
and wherein an amount of the compound represented by Formula 1 is in a range of about 0.5 wt % to about 5 wt % based on total amount of the electrolyte.

15. The lithium secondary battery of claim 14, the compound represented by Formula 1 is a compound represented by Formula 3:

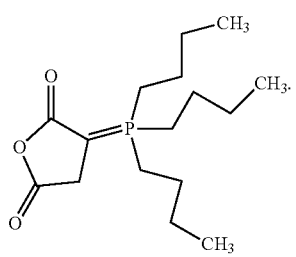

Formula 3

* * * * *